United States Patent
Eberlein et al.

(10) Patent No.: US 12,487,996 B2
(45) Date of Patent: Dec. 2, 2025

(54) LOW-DEVELOPMENT SYSTEM FOR DYNAMIC INFORMATION QUERIES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/711,265

(22) Filed: Apr. 1, 2022

(65) Prior Publication Data
US 2023/0315723 A1    Oct. 5, 2023

(51) Int. Cl.
*G06F 16/242* (2019.01)
*G06F 9/451* (2018.01)
*G06F 16/23* (2019.01)

(52) U.S. Cl.
CPC .......... *G06F 16/2428* (2019.01); *G06F 9/451* (2018.02); *G06F 16/23* (2019.01); *G06F 16/243* (2019.01)

(58) Field of Classification Search
CPC ...... G06F 16/2428; G06F 9/451; G06F 16/23; G06F 16/243
See application file for complete search history.

(56) References Cited

U.S. PATENT DOCUMENTS

| | | | |
|---|---|---|---|
| 2007/0261037 A1* | 11/2007 | Bendapudi | G06F 9/451 717/136 |
| 2019/0034499 A1* | 1/2019 | Das | G06N 3/08 |
| 2020/0019561 A1* | 1/2020 | Doyle | G06F 16/287 |

* cited by examiner

*Primary Examiner* — Aleksandr Kerzhner
*Assistant Examiner* — Aryan D. Toughiry
(74) *Attorney, Agent, or Firm* — Buckley, Maschoff & Talwalkar LLC

(57) ABSTRACT

Systems and methods include reception of an instruction to initiate an inquiry associated with a first instance of a first object type, querying of a system for object metadata defining a plurality of fields of the first object type, generation of a first user interface presenting one or more of the plurality of fields, reception of user input to the first user interface, the user input specifying a first one or more fields of the presented one or more of the plurality of fields, generation of the inquiry specifying the first one or more fields and the first instance, transmission of the inquiry, reception of a response to the inquiry including data associated with the first one or more fields and the first instance, and instructing of a system to update the data associated with the first instance of the first object type based on the received data associated with the first one or more fields and the first instance.

14 Claims, 10 Drawing Sheets

LOW-DEVELOPMENT SYSTEM FOR DYNAMIC INFORMATION QUERIES

BACKGROUND

Modern computing systems execute applications to provide functionality to users. Typically, this functionality includes the presentation and manipulation of stored data. In order to preserve the integrity of this stored data for a given application, the data may only be created, modified and deleted by a defined group of dedicated application users, and not by any other users of the application.

Data may be stored as instances of classes, or object types. An object type represents a logical entity and is defined by metadata which specifies functionality (e.g., in the form of methods) and data (e.g., in the form of attributes) of the logical entity. An application may provide a "maintenance" user interface for each object type which is usable by the defined group of dedicated users to create, modify and delete data of instances of the object type.

An application uses instance data to control actions or serve as a data source for triggered processes. During the execution of a process involving a specific instance, a situation may arise in which data of the instance needs to be updated in order to complete the process. Accordingly, a member of the above-mentioned dedicated user group must obtain the new data and update the instance data. These actions create delays and unplanned workload variations, the severity of which depends on the accessibility of the new data.

It may therefore be desirable to allow another user to create, modify and delete instance data. For example, certain missing instance data may be most-readily accessible to another user who is not a member of the dedicated user group, or even to a person who is not a user of the application. Some applications provide "self-service" user interfaces which can be used by users who are not member of the dedicated user group to modify instance data. However, these user interfaces must be developed individually for each object type, which requires significant and usually prohibitive development resources.

The foregoing approach, even if it were feasible, would not address the creation or modification of instance data by a person who is not a user of the application. For example, since such a person is not a user of the application, the application will typically not provide either the technical infrastructure or processes to manage the person's access to a self-service user interface.

Regardless of the user or person from whom instance data is desired, the particular fields of an instance which are suitable for updating via a self-service user interface may vary depending on the situation at hand. Suitable fields are therefore preferably determined by a qualified user in view of the current situation, and only those fields should be made accessible via a self-service user interface. Current implementations of self-service user interfaces fail to provide this functionality.

Systems are desired to efficiently facilitate updating of application instance data by selected parties.

DETAILED DESCRIPTION

The following description is provided to enable any person in the art to make and use the described embodiments. Various modifications, however, will be readily apparent to those in the art.

Generally, some embodiments facilitate efficient generation of an inquiry associated with an object instance managed by an application, transmission of the inquiry to a person, reception of a response to the inquiry, and update of the data of the object instance based on the response. The person to whom the inquiry is transmitted and from whom the response is received need not possess application-managed authorization to modify the object instance and need not even be a user of the application. Moreover, some embodiments advantageously include a low-code extension mechanism which automates aspects of the process using a generic infrastructure and automatically-generated content.

Figure 1:
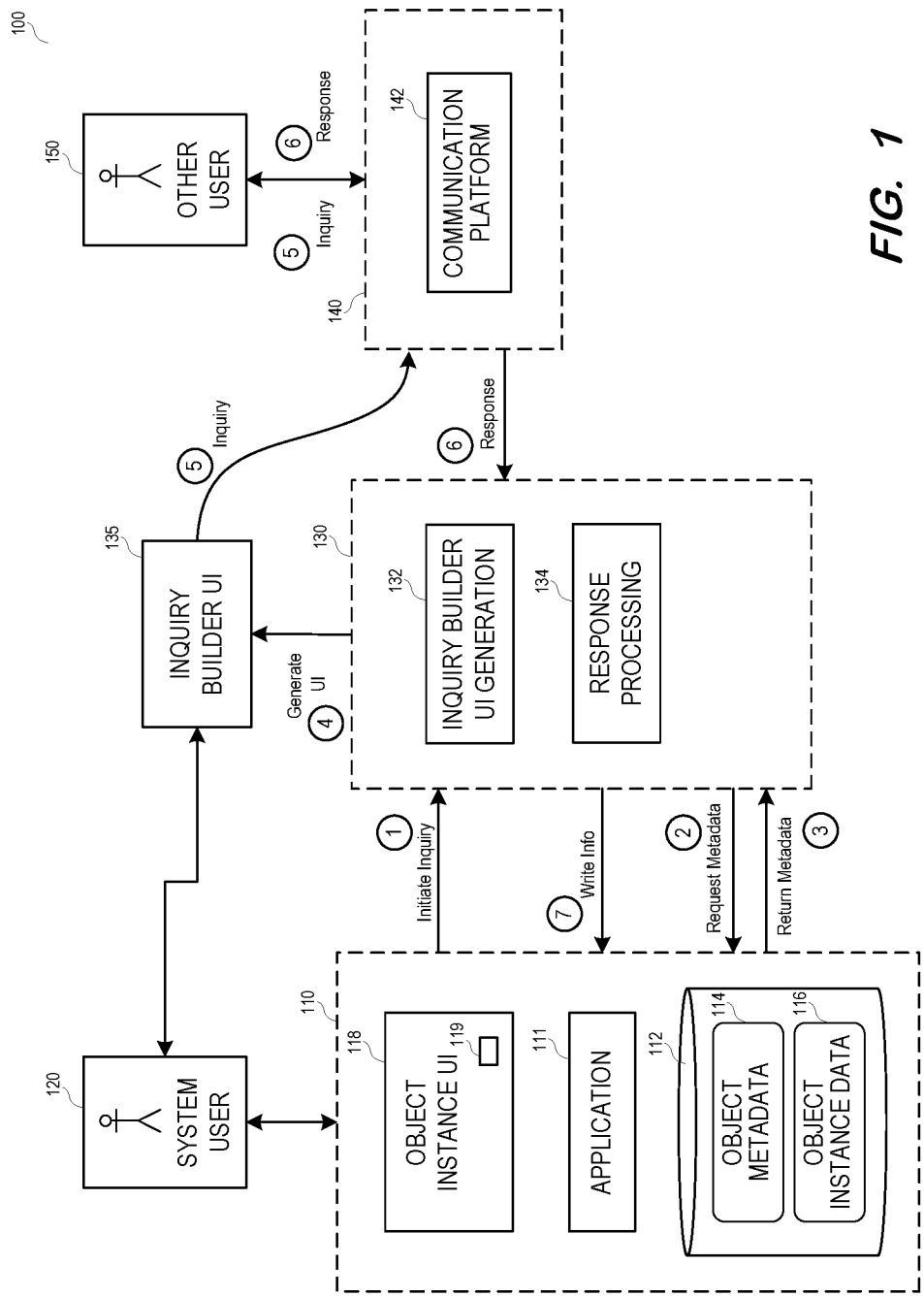
FIG. 1 is a block diagram of an architecture for generating and processing responses to instance data inquiries according to some embodiments.

FIG. 1 is a block diagram of architecture 100 for generating and processing responses to instance data inquiries according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Application server 110 may provide a platform and services for execution of application 111 as is known in the art. Such a platform may include required hardware (including virtualized hardware of a virtual machine), an operating system, device drivers, data and lifecycle management services, etc. Application server 110 may execute other applications in addition to application 111.

Application 111 is executed to provide functionality to users based on data stored in storage 112. Storage 112 may comprise any standalone or distributed storage system that is or becomes known, including but not limited to a database system which is separate from the hardware implementing application server 110. In this regard, application server 110 is depicted using a dashed line to indicate that the components thereof may be located remote from one another, and in an on-premise, cloud-based or hybrid configuration.

Storage 112 stores object metadata 114 which defines methods and attributes of object types managed by application 111. Object metadata 114 may also define a schema which describes relationships between attributes of heterogeneous object types. Object metadata 114 may define other logical entities associated with application 111, such as but not limited to views which include selected attributes of one or more object types.

Object instance data 116 includes data associated with attributes of instances of the object types defined by object metadata 114. For example, object metadata 114 may define employee, order, and upgrade object types, and object instance data 116 may include data associated with a plurality of specific employees, orders and upgrades. The data of a specific instance of an object type conforms to metadata 114 of the object type.

In typical operation, application server 110 executes application 111 to provide user interfaces to users such as system user 120. For example, system user 120 may operate a Web browser to issue a HyperText Transfer Protocol (HTTP) request including a Uniform Resource Locator (URL) associated with application 111 and receive a user interface therefrom in response. User 120 enters credentials into the user interface and is authenticated, which initiates an exchange of commands and information between system user 120 and application 111. The commands are issued by user 120 via manipulation of user interfaces provided by application 111. Embodiments are not limited to the foregoing scenario, as user 120 may execute a dedicated front-end client application for accessing the functionality provided by application 111.

Application 111 may provide user interfaces for managing data of an object instance stored in data 116. Such a user interface may comprise a maintenance user interface but embodiments are not limited thereto. User 120 may access a maintenance user interface to manage data of an instance upon detection of a problem associated with the instance.

In one non-exhaustive example, object instance data 116 may store data of an instance of an order object. The instance data includes one or more items and associated quantities, payment information and customer (i.e., purchaser) information. The customer information may include a shipping address to which the items should be shipped. During the process of shipping the items, the shipping company determines that the shipping address does not exist or is otherwise unsuitable to receive the items, and transmits a corresponding message to application 111. The message is received by user 120, who determines that the shipping address of the instance data should be updated.

System user 120 also determines that the customer is the most suitable source of the updated shipping address. In prior systems, system user 120 would be required to retrieve contact information for the customer and use manual means to contact the customer using the contact information, to acquire the information from the customer, and to update the instance data using a maintenance user interface or the like.

According to some embodiments, upon determining the need to update the address information, system user 120 accesses object instance user interface 118, which may comprise a maintenance user interface presenting data of the instance as described above. User interface 118 includes Inquire control 119, which may be selected by system user 120 to initiate transmission to the customer of an automated inquiry associated with the instance. Embodiments may utilize any other user interface metaphor suitable for requesting data associated with a particular object instance.

Selection of Inquire control 119 triggers inquiry system 130. Advantageously, and as will be evident from the description herein, inquiry system 130 may be generic to the application and object types in conjunction with which it is used. Accordingly, with relatively little development effort, inquiry system 130 may be incorporated as an extension to any applications providing user interfaces based on object types and an API to modify object instance data.

The triggering of inquiry system 130 passes the object type and an identifier of the instance to inquiry system 130. In some embodiments, the trigger comprises an HTTP request to a URL associated with inquiry system 130, and the object type and instance identifier are passed as parameters of the HTTP request. In response to the request, inquiry builder user interface generation component 132 queries application 111 for metadata of the specified object type. The query may comprise a call to an Application Programming Interface (API) provided by application 111 to request metadata of object metadata 114. The call may request the fields (i.e., attributes) and actions (i.e., methods) of the object type.

The requested metadata is returned to inquiry builder user interface generation component 132, which generates inquiry builder user interface 135 based thereon. Inquiry builder user interface 135 includes user interface controls which allow user 120 to define an inquiry to be sent to a desired person (e.g., the customer of the above order instance example). According to the example of FIG. 1, the other person to whom the inquiry will be transmitted is represented by other user 150, who may comprise a registered user of application 111 or a person who is not a registered user. As will be described below, the inquiry may be transmitted to more than one people (e.g., members of a channel of a collaboration platform).

Inquiry builder user interface 135 provides user interface controls which allow user 120 to select fields of the identified instance for which data is to be requested, fields whose data should be included in the inquiry (e.g., in order to provide context to user 150), and a communication protocol identifier (e.g., an e-mail address, an instant messenger address) which should be used to transmit the inquiry to user 150. In some embodiments, user interface 135 proposes actions from which user 150 may select. For example, in the case of an instance of an upgrade process object type, the proposed actions may be "re-try", "abort", "reset", and "ignore". User interface 135 may also include message text explaining the desired information and/or purpose of the inquiry, and/or additional information from storage 112. Referring again to an upgrade process instance, the additional information may include an error summary and analysis document comprising logs and information related to an upgrade error.

After user 120 has manipulated inquiry builder user interface 135 to define the inquiry, the inquiry is sent to communication system 140 providing communication platform 142. As described above, communication platform 142 is specified by user 120 within the inquiry definition. Communication platform 142 may comprise an e-mail server, a tenant of a collaboration platform such as Slack or Microsoft Teams, a dedicated portal, or any other suitable communication platform. Also passed to communication platform 142 is a platform-specific identifier of user 150, such as an e-mail address or collaboration channel identifier. In return, system 130 receives a message identifier, thread identifier or other identifier for this communication instance from communication platform 142.

Platform 142 transmits a message to user 150 based on the platform-specific identifier of user 150, and user 150 receives the message over the corresponding communication channel. The message includes the inquiry as defined by user 120 using inquiry builder user interface 135. For example, the message text may include an identifier of the subject object instance, the data of fields selected by user 120, and a standardized message listing the fields for which data is being requested.

User 150 generates a response to the message over the same channel from which it was received. For example, the response may comprise an e-mail reply or a post to a conversation within a Teams channel. In the case of a Teams or other collaboration channel, all members of the channel may first review the received message, discuss the response in the channel, and then post the response to the channel.

The reply e-mail, channel post, or other response is received by response processing component 134 of system 130 from communication platform 142. In one example, component 134 monitors the collaboration channel for a "wakeword" which indicates that the following text comprises a response to the inquiry. Component 134 may extract the requested data from the reply e-mail, post, or other response using a natural language processing service and map the extracted data to the requested instance fields.

In some embodiments, and as will be described below, the inquiry sent to user 150 includes a link (i.e., a URL) associated with a user interface generated by system 130 specifically for the inquiry defined by user 120. The user interface may include an identifier of the subject object instance, the data of certain instance fields selected by user 120, and user interface controls (e.g., input fields, drop-down boxes, check boxes) for providing requested data. User 150 may select the link, receive the user interface from system 130 in response, input the requested instance data to the user interface, and submit the requested instance data to system 130 via the user interface.

The response includes an identifier which allows response processing component 134 to map the response to its corresponding inquiry. In some embodiments, in order to validate the response, it is determined whether a difference between the time at which the response was received and the time at which the inquiry was sent exceeds a predefined expiration time. Other validation processes according to some embodiments will be described below.

System 130 calls an API of application 111 to write the requested data of the identified instance to object instance data 116 and/or to trigger the selected action on the identified instance. According to some embodiments, the write or trigger is aborted if a state of the instance has changed since the inquiry was sent to communication platform 142. This process prevents potential overwriting of new information with conflicting information and may include notifying user 150 that the instance was not updated/triggered. Some embodiments include transmission of an approval request to user 120 and approval of the request as a prerequisite to writing the new instance data or triggering the selected action.

Figure 2:
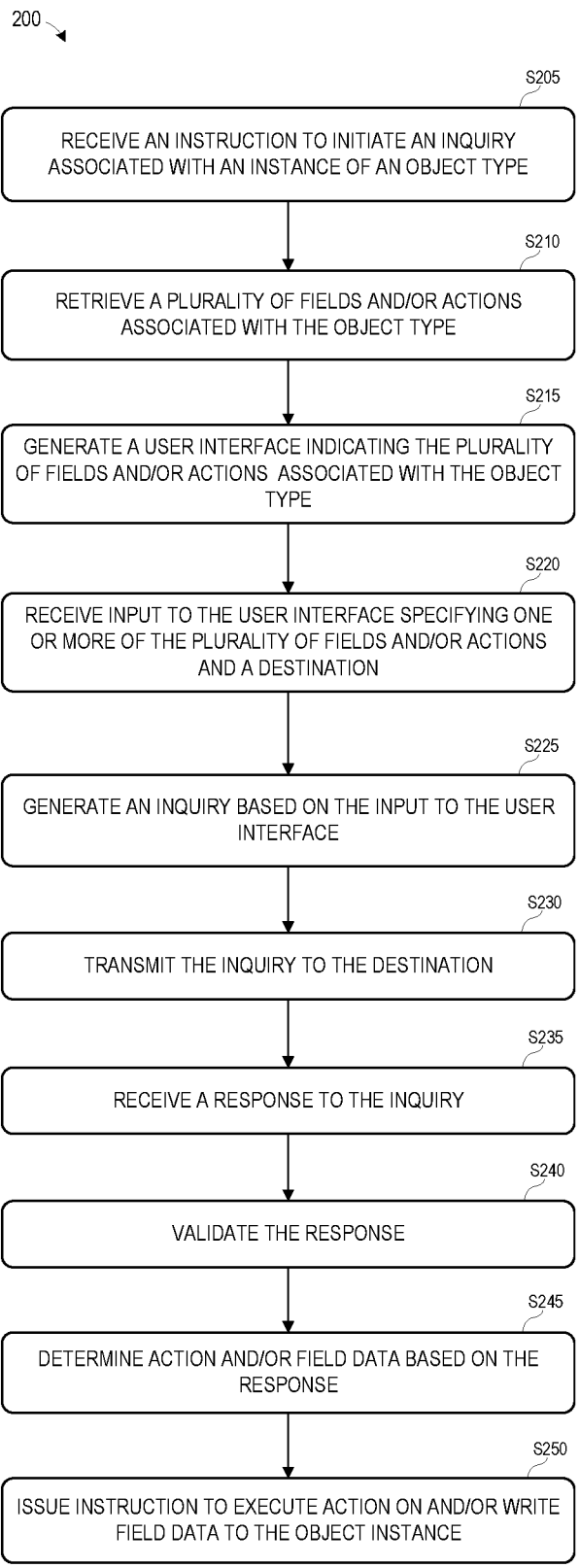
FIG. 2 is a flow diagram of a process for generating and processing responses to instance data inquiries according to some embodiments.

FIG. 2 comprises a flow diagram of process 200 according to some embodiments. Process 200 may be performed by architecture 100, but embodiments are not limited thereto. Process 200 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
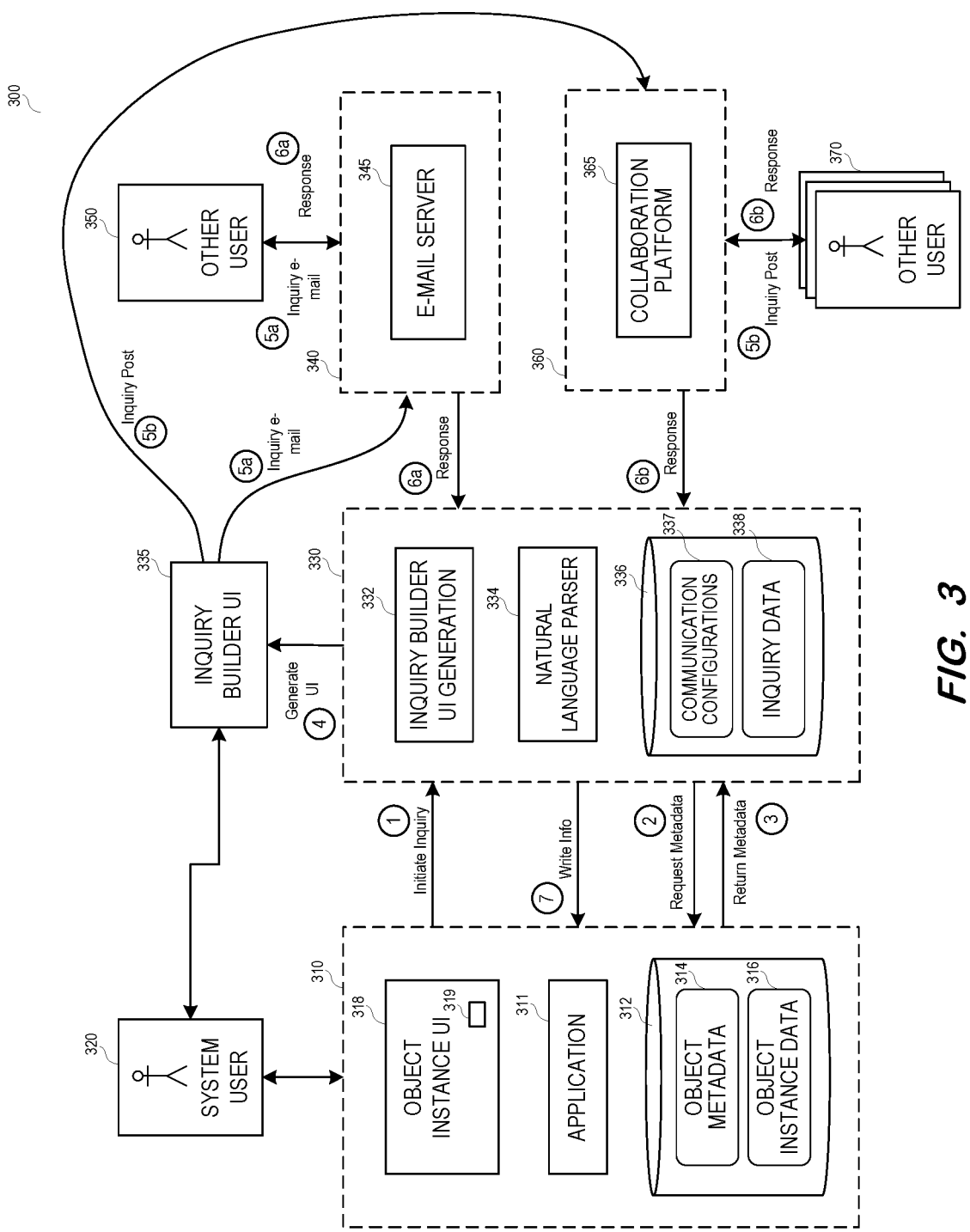
FIG. 3 is a block diagram of an architecture for generating and processing responses to instance data inquiries according to some embodiments.

FIG. 3 illustrates architecture 300 to assist in describing examples of process 200 according to some embodiments. Architecture 300 may comprise an implementation of architecture 100, but embodiments are not limited thereto.

Initially, an instruction to initiate an inquiry associated with an instance of an object is received at S205. Application 311 may provide object instance user interface 318 for managing data stored in object instance data 316. In some examples, user 320 may access object instance user interface 318 to manage data of an instance upon detection of a problem associated with the instance.

Figure 4:
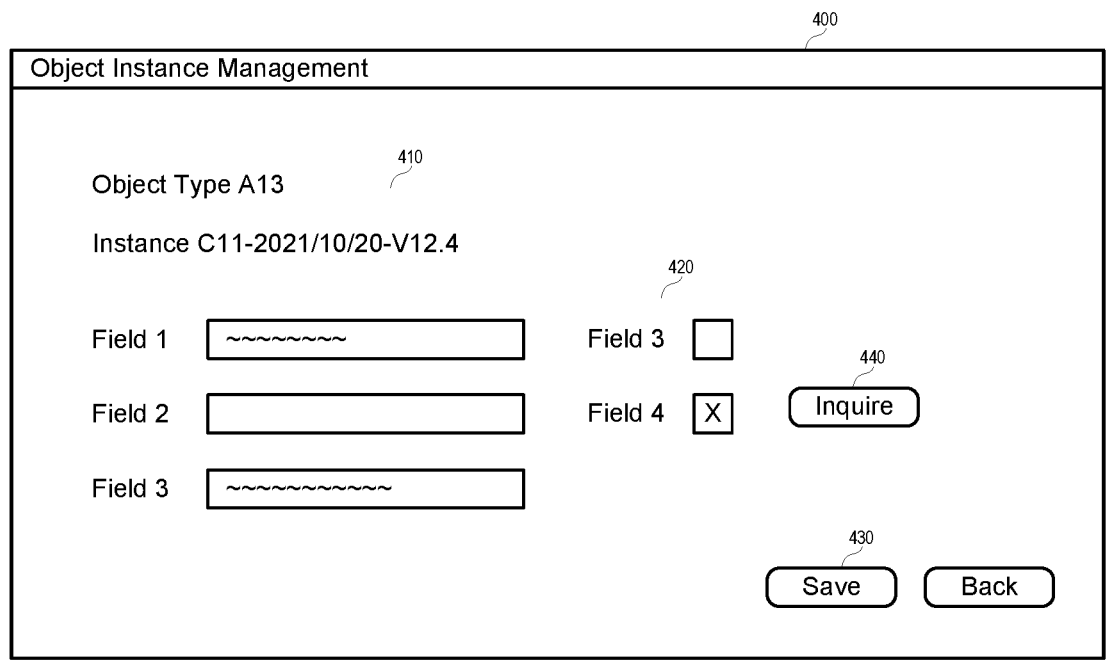
FIG. 4 is a view of a user interface for managing data associated with an object instance according to some embodiments.

FIG. 4 illustrates object instance user interface 400 for viewing and modifying data associated with a particular object instance according to some embodiments. User interface 400 may be presented to user 320 via a Web browser executing on a computing system operated by user 320 during interaction with application 311. Area 410 of user interface 400 indicates the object type of an instance and an identifier of the instance. Area 420 presents fields of the instance along with data associated with each field of the instance within object instance data 316, if any. As shown, the instance does not include data associated with Field 2 or with Field 4. Typical object instances may include many more fields than shown in user interface 400.

User 320 may create or modify data of any field of area 420 and save the modified data to instance data 316 using Save control 430. According to some embodiments, user 320 selects control 440 to initiate an inquiry associated with the subject object instance. The inquiry is received by system 330 at S205.

The inquiry includes the object type and an identifier of the instance. In response, inquiry builder user interface generation component 332 queries application 311 at S210 for metadata of the specified object type using, for example, an API provided by application 311 for this purpose. The query may request the fields and actions of the object type. The plurality of fields and/or actions are received by system 330 at S210.

System 330 uses the plurality of fields and/or actions to generate a user interface indicating the plurality of fields and/or actions at S215. In some embodiments, inquiry builder user interface generation component 332 generates inquiry builder user interface 335 at S215 and transmits interface 335 to user 320.

Figure 5:
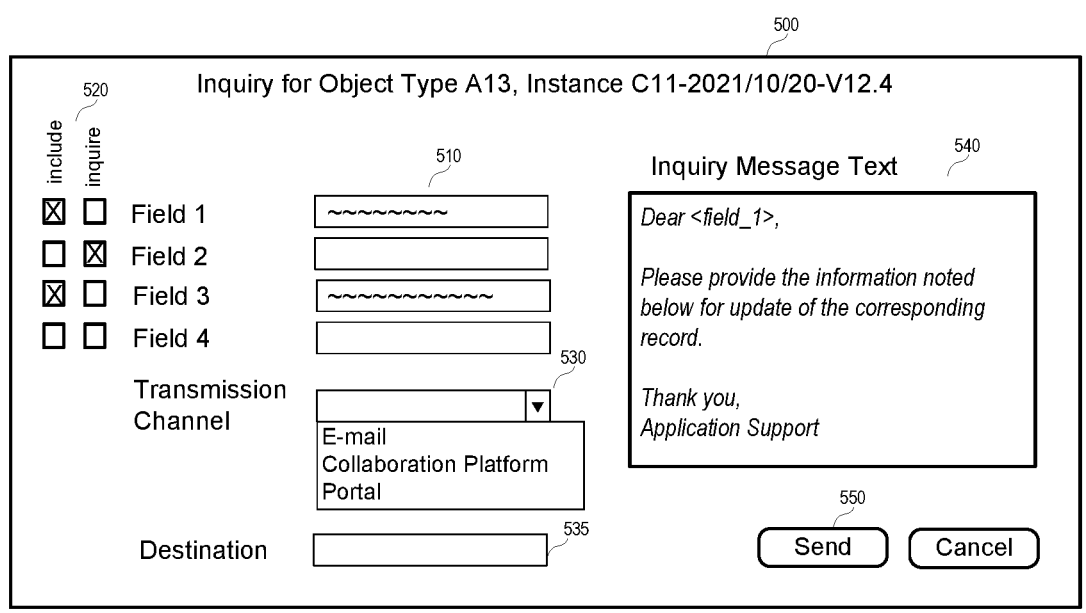
FIG. 5 is a view of a user interface for specifying object attributes and a transmission channel of an instance data inquiry according to some embodiments.

User interface 500 of FIG. 5 is an example of inquiry builder user interface 335 according to some embodiments. User interface 500 identifies the object type and instance associated with the inquiry, and includes text boxes 510 which display instance data, if any, associated with each field. Include and inquire checkboxes 520 allow a user to specify, respectively, the instance data to be included in the inquiry and the instance data to be requested by the inquiry.

Drop-down menu 530 is populated with one or more communication channels. In this regard, storage 336 of system 330 includes communication configurations 337. Communication configurations 337 may specify, for each of one or more communication channels, configuration information needed to transmit an inquiry via the communication channel. Communication configurations 337 may specify an e-mail server associated with application 311 and associated credentials, a collaboration platform associated with application 311 and associated credentials, etc. Inquiry builder user interface generation component 332 therefore may retrieve information from communication configurations 337 which is associated with the application or system for which the inquiry request was initiated, and populate drop-down menu 530 of user interface 500 based on the information.

Text box 535 allows the user to specify a destination for the inquiry. The destination may comprise an identifier associated with the selected communication channel and with one or more persons for whom the inquiry is intended. For example, the destination may comprise an e-mail address, a collaboration channel identifier, or the like.

User interface 500 also includes text area 540 for receiving text to be included in the inquiry. The text may be explanatory in order to facilitate the recipient's understanding of the inquiry, and is input into area 540 by user 320. As shown, the text may include tags which correspond to fields of the object type, and which are populated with corresponding data of the subject instance during generation of the inquiry. Embodiments are not limited to user interface 500. In one example, and due to the expected large number of fields of a subject object type, inquiry builder user interface 335 may present the fields as a collapsed and selectively-expandable hierarchical tree.

User input to inquiry builder user interface 335 is received at S220 upon user selection of Send control 550. As described, the input may specify one or more of the plurality of fields and/or actions, as well as a destination. An inquiry is generated at S225 based on the received input. Generally, the inquiry is formatted for the selected communication channel and includes those fields of the subject instance which were selected within user interface 335 for inclusion in the inquiry and requests those fields which were selected within user interface 335 as needed. The inquiry may include any other suitable information, including message text entered into user interface 335 as described above.

The generated inquiry is transmitted to the specified destination at S230. In a case the destination is an e-mail address, S230 may comprise sending the inquiry as an e-mail to e-mail server 345 of system 340, with the destination included as the To: address. If the destination is a Teams channel, S230 may comprise logging in to the Teams channel of collaboration platform 355 provided by system 360 and posting the inquiry thereto. As mentioned above, system 330 may receive a message identifier, thread identifier or other identifier of the inquiry from the communication platform 345, 355 to which the inquiry is transmitted.

Transmission of the inquiry at S230 may also include writing of corresponding information to inquiry data 338 of storage 336. The information may be used to match a received response to the inquiry, to validate a response, and to guide writing of instance data to object instance data 316 as will be described below. According to some embodiments, the information includes the object type and the instance identifier, and the fields and/or actions requested by the inquiry, and the communication channel and identifier of the inquiry received from the communication channel. In some embodiments, a timestamp indicating a time at which the inquiry was transmitted is also written to inquiry data 338.

Figure 6:
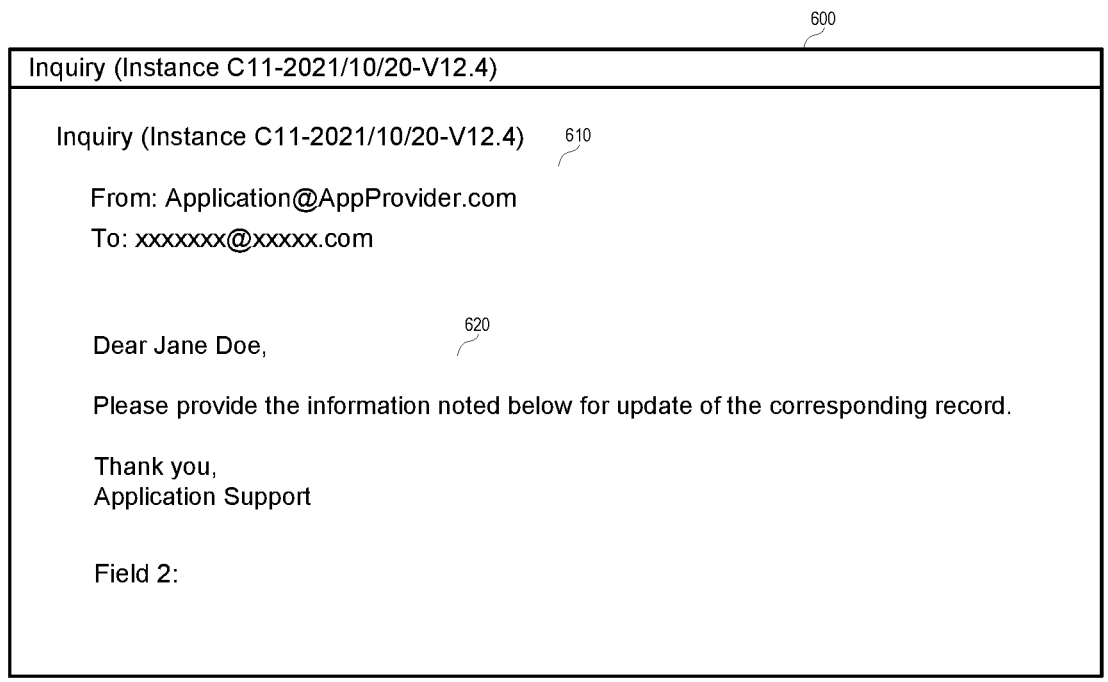
FIG. 6 is a view of a user interface presenting an e-mail inquiry according to some embodiments.

Each of e-mail server 345 and collaboration platform 355 is presumed to operate as intended to transmit the inquiry via e-mail or collaboration channel to a respective user 350 or respective one or more users 370, respectively. FIG. 6 illustrates user interface 600 of an e-mail client application presenting an inquiry e-mail transmitted according to some embodiments of S230. The e-mail inquiry includes From: and To: (i.e., destination) addresses 610 and message text 620. With reference to user interface 500, message text 620 is populated with selected instance data and indicates a field (i.e., Field 2) of the specified instance for which data is requested.

A response to the inquiry is generated by the user or users who received the inquiry. Generation of the response may comprise, in one example, selecting a Reply option provided by the e-mail client application and adding the requested data after the text "Field 2:". Embodiments may employ any other suitable manner of providing the requested data within an e-mail. The response is returned to system 330 via the same communication channel over which the inquiry was transmitted. The response is received by system 330 at S235 due to system 330 being associated with the From: address (i.e., if the inquiry was transmitted via e-mail) or due to system 330 detecting a response to the inquiry on a collaboration channel (i.e., if the inquiry was transmitted via the collaboration channel).

The received response is validated at S240. For example, S240 may include determining whether an identifier of the inquiry included the response matches an identifier which was received from the communication platform upon transmission of an inquiry and stored in inquiry data 338 as described above. If so, a timestamp associated with the stored identifier is compared to a timestamp of the response to determine whether the difference between the two timestamps exceeds an expiration period.

A requested action and/or instance field data is determined at S245 based on the response. According to system 300, text included within the response is parsed by natural language parser 334 to identify selected actions and/or user-provided instance data. In some embodiments, the identifier of the inquiry stored in inquiry data 338 is also stored in associated with identifiers of the actions and/or fields requested by the inquiry. Natural language parser 334 may use these identifiers to assist parsing of the response to determine the requested action and/or instance field data in some embodiments of S245.

An instruction is issued at S250 to execute the determined action on and/or write the determined field data to the subject object instance. As described above, inquiry data 338 associates an identifier of the currently-processed inquiry with the object type and instance identifier which were originally passed to system 330 at S205. System 330 may therefore call an API of application 311 using the object type and instance identifier stored in inquiry data 338 in order to write the requested data of the instance to object instance data 316 and/or to trigger the selected action on the instance at S250.

System 330 may also be configured to perform maintenance tasks. For example, data of inquiry data 338 which is associated with a specific inquiry identifier may be deleted once a response to the inquiry has been received or after expiration of a predetermined time period from initial transmission of the inquiry. Other maintenance tasks may include periodic update of communication configurations 337 to add new communication channels and/or delete unusable communication channels.

Figure 7:
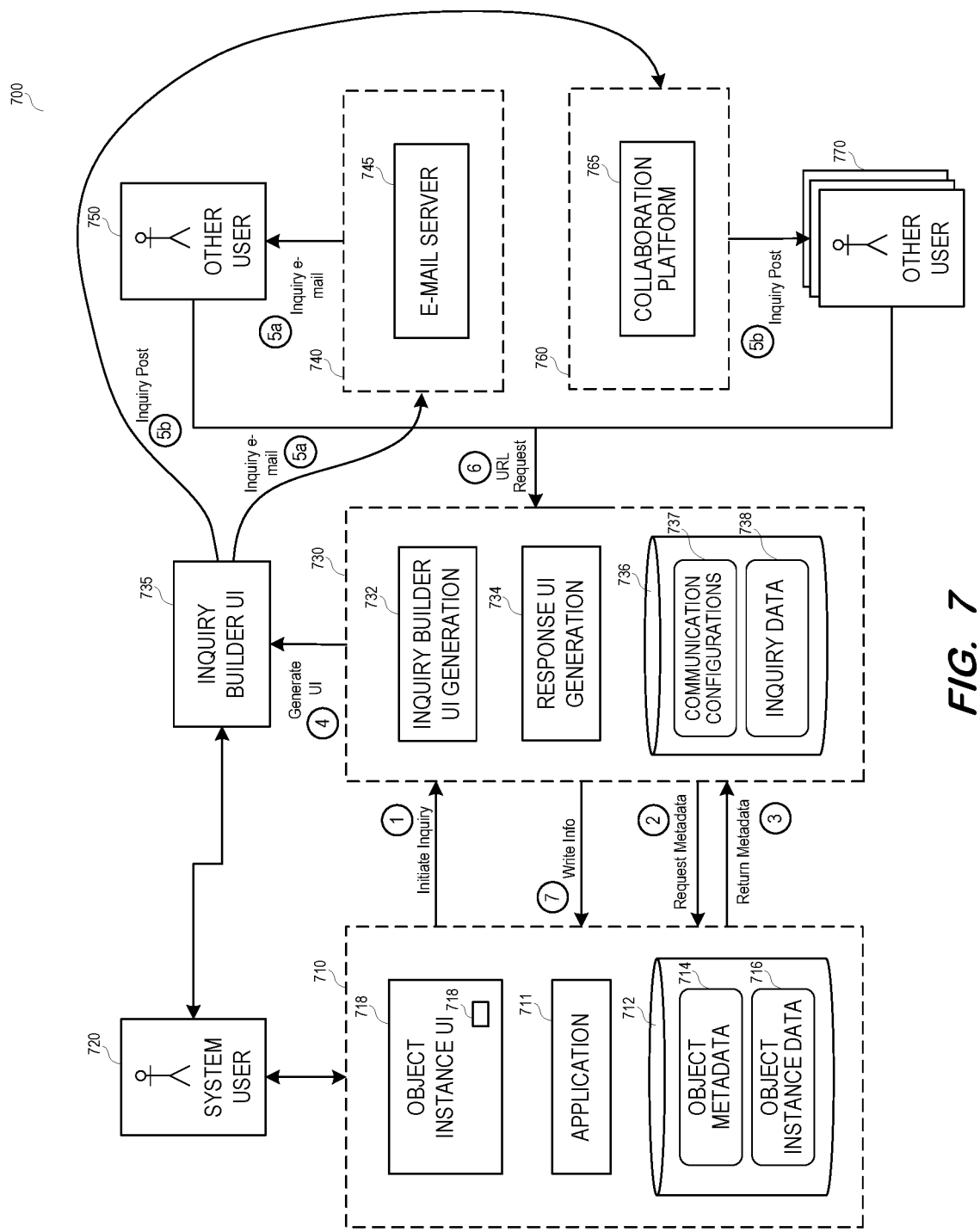
FIG. 7 is a block diagram of an architecture for generating and processing responses to instance data inquiries according to some embodiments.

FIG. 7 illustrates architecture 700 according to some embodiments. Architecture 700 may comprise an implementation of architecture 100, but embodiments are not limited thereto. Each component of FIG. 7 may be implemented as described above with respect to similarly-named components of architecture 100 and/or architecture 300.

According to architecture 700, user interface generation component 734 of system 730 generates a user interface once system user 720 issues a command via inquiry builder user interface 735 to send an inquiry. The user interface is generated based on the fields, actions and/or text specified by user 720 using inquiry builder user interface 735 as described above.

The inquiry transmitted to user 750 or user 770 via e-mail or collaboration channel includes a unique temporary URL which is usable to access the user interface generated by user interface generation component 734 for the inquiry. In some embodiments, the URL includes an identifier consisting of a secure random number. Upon transmission of the inquiry, the URL may be stored in inquiry data 738 in association with the inquiry identifier and the other data described above.

Figure 8:
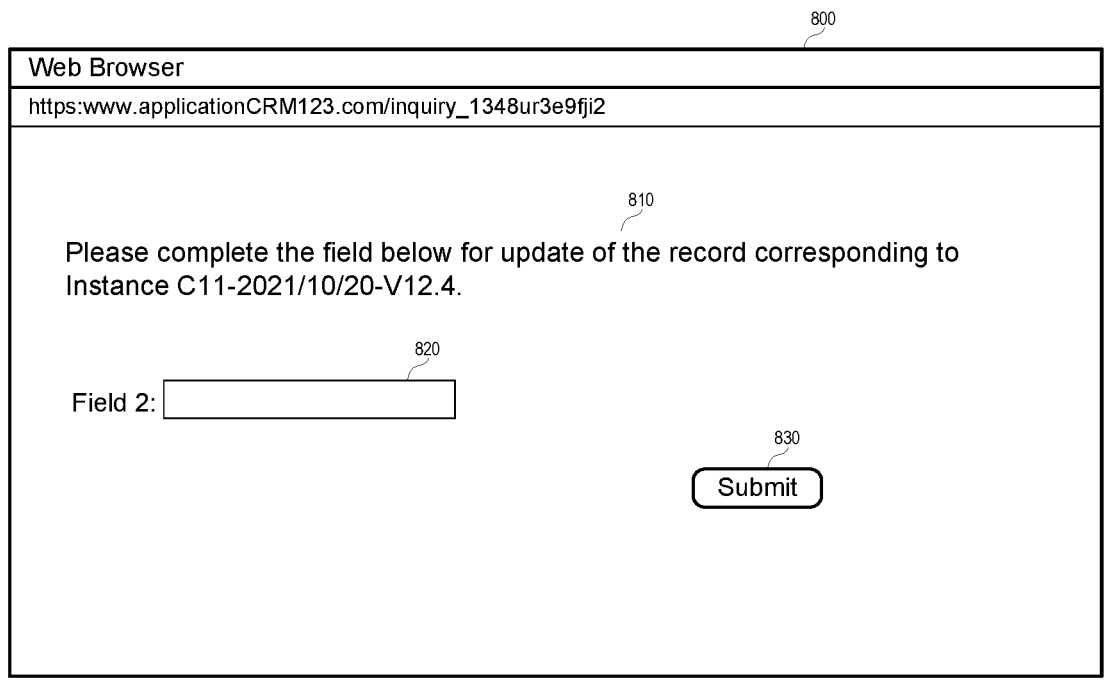
FIG. 8 is a view of a user interface presenting a URL-based inquiry according to some embodiments.

A user receiving an inquiry e-mail or post including such a URL may simply select the URL to receive a Web page including the corresponding user interface generated by user interface generation component 734. FIG. 8 illustrates user interface 800 generated by component 734 and displayed by a Web browser of user 750 or 770 according to some embodiments. Interface 800 includes text 810 identifying the subject instance and input field 820 for providing requested data. A user interface according to some embodiments may include other user interface controls and data associated with fields of the instance. Selection of Submit control 830 causes system 730 to receive data input into field 820 at S235.

The response may be validated as described above. The user interface generated by component 734 may be deleted from system 730 after a defined lifespan or after a response has been received via the user interface. The secure random number of the URL provides additional security from unwanted access to the URL.

Figure 9:
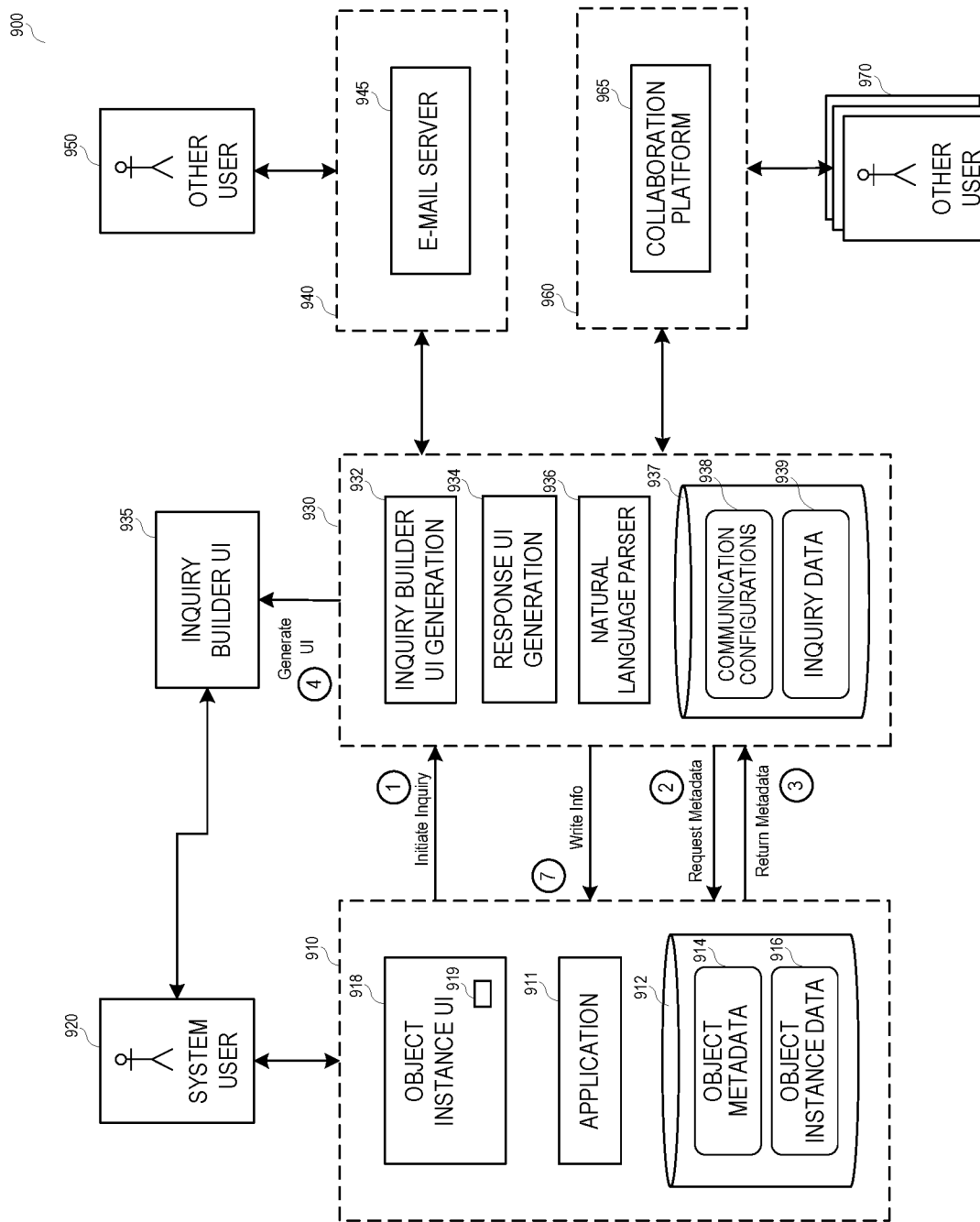
FIG. 9 is a block diagram of an architecture for generating and processing responses to instance data inquiries according to some embodiments.

FIG. 9 illustrates architecture 900 according to some embodiments. Architecture 900 includes components of both architecture 300 and architecture 700. Architecture 900 is therefore capable of transmitting inquiries via multiple communication channels and of receiving data in response to the inquiries via text (which is subsequently parsed by natural language parser 936 as described above) or via a user-accessible user interface generated by response user interface generation component 934.

Figure 10:
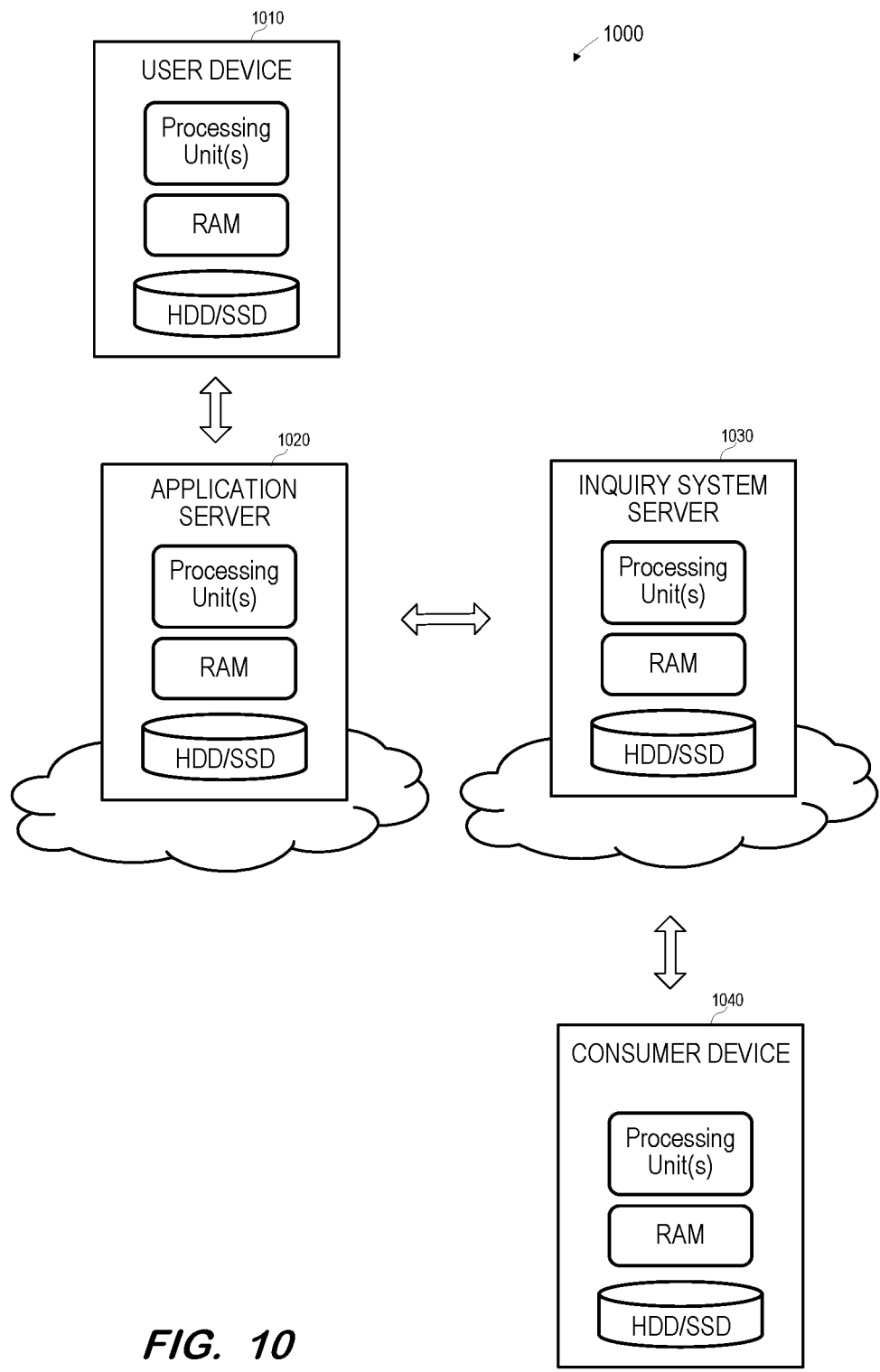
FIG. 10 is a block diagram of a cloud-based system according to some embodiments.

FIG. 10 illustrates cloud-based database deployment 1000 according to some embodiments. In this regard, application server 1020 and inquiry system server 1030 may comprise cloud-based compute resources, such as virtual machines, allocated by a public cloud provider providing self-service and immediate provisioning, autoscaling, security, compliance and identity management features. An application operating in conjunction with some embodiments may execute on a same server as an inquiry system as described herein.

User device 1010 may communicate with an application executing on application server 1020, for example via a Web Browser executing on user device 1010. The communication may include an instruction to initiate an inquiry associated with an object instance managed by the application as described herein. Inquiry system server 1030 may provide a user interface to user device 1010 to allow a user to specify fields, actions and/or text of the inquiry, and may transmit the inquiry to a person operating consumer device 1040, for example via e-mail or collaboration channel. Inquiry system server 1030 receives a response to the inquiry, validates the response, and updates data of the object instance stored by application server 1020 based thereon.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architecture 100 may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a first system comprising:
   a first data storage comprising:
      object metadata defining one or more fields of each of a plurality of object types; and
      data associated with a plurality of instances of each of the plurality of object types,
   the first system to receive an instruction from a first user to generate an inquiry associated with a first instance of a first object type of the plurality of instances of the plurality of object types; and a second system comprising:
  an inquiry builder user interface component to:
    query the first system to retrieve object metadata defining a plurality of fields of the first object type;
    query the first system to retrieve data associated with the first instance of the first object type;
    generate a first user interface presenting one or more of the plurality of fields and data associated with the first instance and with at least one of the one or more of the plurality of fields; and
    present the first interface to the first user,
  the second system to:
    receive user input of the first user to the first user interface, the user input specifying a first one or more fields of the presented one or more of the plurality of fields for which the inquiry is to request data and a second one or more fields of the presented one or more of the plurality of fields whose data of the first instance is to be included in the inquiry;
    generate the inquiry requesting data of the first one or more fields of the first instance;
    generate a uniform resource locator uniquely associated with the inquiry;
    store the uniform resource locator in association with the inquiry;
    transmit the uniform resource locator to a second user;
    receive a request for the uniform resource locator from the second user;
    in response to the request, return a second user interface including the inquiry to the second user;
    receive a response to the inquiry from the second user via the second user interface, the response including the requested data of the first one or more fields of the first instance; and
    instruct the first system to update the data of the first instance based on the received data of the first one or more fields of the first instance.

2. A system according to claim 1, wherein transmission of the uniform resource locator comprises:
  storing, at the second system, the uniform resource locator association with an identifier of the first instance, an identifier of the first one of the plurality of object types, and a timestamp indicating a time at which the uniform resource locator was transmitted, and
wherein reception of the request comprises:
  determining, based on the timestamp, whether a reception time of the response is after an expiration period of the uniform resource locator.

3. A system according to claim 2, wherein instruction of the first system to update the data comprises:
  providing of the data, the identifier of the first instance, and the identifier of the first object type to the first system.

4. A system according to claim 1, wherein reception of the response comprises:
  performing of natural language parsing on the response to determine the data associated with the first one or more plurality of fields and the first instance.

5. A system according to claim 1, the first system to receive an instruction from the first user to initiate a second inquiry associated with a second instance of a second object type of the plurality of object types,
  the inquiry builder user interface component to query the first system to retrieve object metadata defining a second plurality of fields of the second object type and data associated with the second instance of the first object type, generate a second user interface presenting one or more of the second plurality of fields and data associated with the second instance and with at least one of the one or more of the second plurality of fields, and present the second user interface to the first user, and
the second system to:
  receive second user input of the first user to the second user interface, the second user input specifying a third one or more fields of the presented one or more of the second plurality of fields for which the inquiry is to request data and a fourth one or more fields of the second plurality of fields whose data of the second instance is to be included in the inquiry;
  generate the second inquiry requesting data of the third one or more fields of the second instance;
  generate a second uniform resource locator uniquely associated with the second inquiry;
  store the second uniform resource locator in association with the second inquiry;
  transmit the second uniform resource locator inquiry to a third user;
  receive a second request for the second uniform resource locator from the third user;
  in response to the second request, return a third user interface including second the inquiry to the third user;
  receive a second response to the second inquiry from the third user via the third user interface, the second response including the requested data of the third one or more fields of the second instance; and
  instruct the first system to update the data of the second instance based on the received data of the third one or more fields of the second instance.

6. A method comprising:
receiving an instruction from a first user to generate an inquiry associated with a first instance of a first object type;
querying a system to retrieve object metadata defining a plurality of fields of the first object type;
querying the system to retrieve data associated with the first instance of the first object type;
generating a first user interface presenting one or more of the plurality of fields and data associated with the first instance and with at least one of the one or more of the plurality of fields;
presenting the first interface to the first user;
receiving user input to the first user interface from the first user, the user input specifying a first one or more fields of the presented one or more of the plurality of fields for which the inquiry is to request data i and a second one or more fields of the presented one or more of the plurality of fields whose data of the first instance is to be included in the inquiry;
generating the inquiry requesting data of the first one or more fields of the first instance;
generating a uniform resource locator uniquely associated with the inquiry;
storing the uniform resource locator in association with the inquiry;
transmitting the uniform resource locator inquiry to a second user;
receiving a request for the uniform resource locator from the second user;
in response to the request, returning a second user interface including the inquiry to the second user;

receiving a response to the inquiry from the second user via the second user interface, the response including the requested data of the first one or more fields of the first instance; and instructing the system to update the data of the first instance of the first object type based on the received data of the first one or more fields of the first instance.

7. A method according to claim 6, wherein transmitting the uniform resource locator comprises:

storing an identifier of the uniform resource locator in association with an identifier of the first instance, an identifier of the first object type, and a timestamp indicating a time at which the uniform resource locator was transmitted, and wherein receiving the request comprises:

determining, based on the timestamp, whether a reception time of the request is after an expiration period of the inquiry.

8. A method according to claim 7, wherein instructing the system to update the data comprises:

providing the data, the identifier of the first instance, and the identifier of the first object type to the system.

9. A method according to claim 6, wherein receiving the response comprises:

performing natural language parsing on the response to determine the data associated with the first one or more fields and the first instance.

10. A method according to claim 6, further comprising:

receiving an instruction from the first user to initiate a second inquiry associated with a second instance of a second object type;

querying the system to retrieve object metadata defining a second plurality of fields of the second object type;

querying the first system to retrieve data associated with the second instance of the second object type;

generating a second user interface presenting one or more of the second plurality of fields and data associated with the second instance and with at least one of the one or more of the second plurality of fields;

presenting the second user interface to the first user;

receiving second user input to the second user interface from the first user, the second user input specifying a third one or more fields of the presented one or more of the second plurality of fields for which the inquiry is to request data and a fourth one or more fields of the presented second plurality of fields whose data of the second instance is to be included in the inquiry;

generating the second inquiry requesting data of the third one or more fields of the second instance;

generating a second uniform resource locator uniquely associated with the second inquiry;

storing the second uniform resource locator in association with the second inquiry;

presenting the second uniform resource locator inquiry to a third user;

receiving a second request for the second uniform resource locator from the third user;

in response to the second request, returning a third user interface including the second inquiry to the third user;

receiving a second response to the second inquiry from the third user via the third user interface, the response including the requested data of the third one or more fields of the second instance; and instructing the system to update data associated with the second instance based on the received data of the third one or more fields of the second instance.

11. A non-transitory medium storing program code, the program code executable by a processing unit to cause a computing system to:

receive an instruction from a first user to initiate an inquiry associated with a first instance of a first object type;

query a system for object metadata defining a plurality of fields of the first object type;

query the system to retrieve data associated with the first instance of the first object type;

generate a first user interface presenting one or more of the plurality of fields and data associated with the first instance and with at least one of the one or more of the plurality of fields;

present the first interface to the first user;

receive user input to the first user interface from the first user, the user input specifying a first one or more fields of the presented one or more of the plurality of fields for which the inquiry is to request data and a second one or more fields of the presented one or more of the plurality of fields whose data of the first instance is to be included in the inquiry;

generate the inquiry requesting data of the first one or more fields of the first instance;

generate a uniform resource locator uniquely associated with the inquiry;

store the uniform resource locator in association with the inquiry;

transmit the uniform resource locator to a second user;

receive a request for the uniform resource locator from the second user;

in response to the request, return a second user interface including the inquiry to the second user;

receive a response to the inquiry from the second user via the second user interface, the response including the requested data of the first one or more fields of the first instance; and instruct the system to update the data of the first instance of the first object type based on the received data of the first one or more fields of the first instance.

12. A medium according to claim 11, wherein transmission of the uniform resource locator comprises:

storage of an identifier of the uniform resource locator in association with an identifier of the first instance, an identifier of the first object type, and a timestamp indicating a time at which the uniform resource locator was transmitted, and wherein reception of the request comprises:

determination, based on the timestamp, of whether a reception time of the response is after an expiration period of the uniform resource locator, and wherein instructing of the system to update the data comprises:

providing of the data, the identifier of the first instance, and the identifier of the first object type to the system.

13. A medium according to claim 11, wherein reception of the response comprises:

performing of natural language parsing on the response to determine the data associated with the first one or more fields of the first instance.

14. A medium according to claim 11, the program code executable by a processing unit to cause a computing system to:

receive an instruction from the first user to initiate a second inquiry associated with a second instance of a second object type;

query the system to retrieve object metadata defining a second plurality of fields of the second object type;

query the first system to retrieve data associated with the second instance of the second object type;

generate a second user interface presenting one or more of the second plurality of fields and data associated with the second instance and with at least one of the one or more of the second plurality of fields;

present the second user interface to the first user;

receive second user input to the second user interface from the first user, the second user input specifying a third one or more fields of the presented one or more of the second plurality of fields for which the inquiry is to request data and a fourth one or more fields of the presented one or more of the second fields whose data of the second instance is to be included in the inquiry;

generate the second inquiry requesting data of the third one or more fields of the second instance;

generate a second uniform resource locator uniquely associated with the second inquiry;

store the second uniform resource locator in association with the second inquiry;

transmit the second uniform resource locator to a third user;

receive a second request for the second uniform resource locator from the third user;

in response to the second request, return a third user interface including the second inquiry to the third user;

receive a second response to the second inquiry from the third user via the third user interface, the response including the requested data of the third one or more fields of the second instance; and instruct the system to update the data of the second instance based on the received data of the third one or more fields of the second instance.

\* \* \* \* \*